US012761961B2

(12) United States Patent
Nie et al.

(10) Patent No.: US 12,761,961 B2
(45) Date of Patent: Oct. 13, 2026

(54) METHOD, DEVICE, AND PRODUCT FOR ALLOCATING TARGET TASK

(71) Applicant: Dell Products L.P., Round Rock, TX (US)

(72) Inventors: Yuhong Nie, Shanghai (CN); Junyi Wu, Shanghai (CN); Wenlei Wu, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 310 days.

(21) Appl. No.: 18/789,852

(22) Filed: Jul. 31, 2024

(65) Prior Publication Data

US 2025/0390349 A1 Dec. 25, 2025

(30) Foreign Application Priority Data

Jun. 24, 2024 (CN) ........................ 202410822142.X

(51) Int. Cl.
*G06F 9/50* (2006.01)

(52) U.S. Cl.
CPC ...... *G06F 9/5027* (2013.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 7,386,850 B2 * | 6/2008 | Mullen | H04Q 3/64 | 718/104 |
| 8,156,502 B1 * | 4/2012 | Blanding | G06F 9/50 | 718/100 |
| 8,250,581 B1 * | 8/2012 | Blanding | G06F 9/5011 | 718/103 |
| 8,543,711 B2 * | 9/2013 | Rolia | G06Q 30/02 | 709/229 |
| 8,612,987 B2 * | 12/2013 | Naik | G06F 9/505 | 718/104 |

(Continued)

OTHER PUBLICATIONS

Nasir, Ali et al. "Optimized Task Assignment and Predictive Maintenance for Industrial Machines using Markov Decision Process." Jan. 2024.*

(Continued)

*Primary Examiner* — Lewis A Bullock, Jr.
(74) *Attorney, Agent, or Firm* — Ryan, Mason & Lewis, LLP

(57) ABSTRACT

A method illustratively includes acquiring a request for allocation of a target resource for the target task. The method further includes determining a first state and a second state of each node in multiple nodes, wherein the first state is indicative of a current state of available resources of each node, and the second state is indicative of a predicted state of available resources of each node after completion of the target task. The method further includes selecting, based on the first state, the second state, and a state transition policy indicative of a priority of a transition between states, a target node from the multiple nodes for use in performing the target task. This method not only analyzes the current available resources of each node, but also takes into account the predicted available resources after the node completes the target task, and thus can find a more suitable node.

20 Claims, 8 Drawing Sheets

(56) References Cited

U.S. PATENT DOCUMENTS

| | | | | |
|---|---|---|---|---|
| 8,621,477 | B2 * | 12/2013 | Ferdous | G06F 11/3409 718/104 |
| 9,274,850 | B2 * | 3/2016 | Gohad | G06F 9/5072 |
| 9,442,769 | B2 * | 9/2016 | Ferris | G06F 9/505 |
| 9,459,930 | B1 * | 10/2016 | Adogla | G06F 9/5044 |
| 9,501,318 | B2 * | 11/2016 | Cao | G06F 9/4843 |
| 10,417,043 | B1 * | 9/2019 | Braverman | G06F 16/27 |
| 10,754,704 | B2 * | 8/2020 | Rao | G06F 9/4887 |
| 11,750,468 | B2 * | 9/2023 | Sethi | G06N 7/01 709/224 |
| 12,265,857 | B2 * | 4/2025 | Wang | G06F 9/5066 |
| 12,277,447 | B1 * | 4/2025 | Bates | G06F 9/5027 |
| 12,288,103 | B1 * | 4/2025 | Bates | G06F 9/505 |
| 12,326,840 | B1 * | 6/2025 | Bates | G06F 16/213 |
| 2008/0172673 | A1 * | 7/2008 | Naik | G06F 9/5083 718/104 |
| 2009/0113056 | A1 * | 4/2009 | Tameshige | G06F 9/5011 709/226 |
| 2017/0161117 | A1 * | 6/2017 | Fukuda | G06F 9/5083 |
| 2017/0228258 | A1 * | 8/2017 | Shifman | G06F 9/5027 |
| 2022/0413941 | A1 * | 12/2022 | Ramtekkar | G06F 9/5022 |
| 2023/0118846 | A1 * | 4/2023 | Ocon Cardenas | G06F 9/5005 718/104 |
| 2024/0338254 | A1 * | 10/2024 | Muttikal Thomas | G06F 9/45558 |

OTHER PUBLICATIONS

Nadeem, Farrukh et al. "Resource Availability Prediction in the Grid: Taxonomy and Review of State of the Art." International Journal of Engineering and Applied Computer Science (IJEACS). Dec. 2016.*

Amazon AWS, "What is Load Balancing?" https://aws.amazon.com/cn/what-is/load-balancing/, Accessed Mar. 14, 2024, 9 pages.

Wikipedia, "Euclidean Distance," https://en.wikipedia.org/wiki/Euclidean_distance, Mar. 8, 2024, 8 pages.

K.-C. Huang et al., "Processor Allocation Policies for Reducing Resource Fragmentation in Multi-cluster Grid and Cloud Environments," https://ieeexplore.ieee.org/document/5685368, International Computer Symposium, Dec. 2010, Abstract Only.

* cited by examiner

METHOD, DEVICE, AND PRODUCT FOR ALLOCATING TARGET TASK

RELATED APPLICATION

The present application claims priority to Chinese Patent Application No. 202410822142.X, filed Jun. 24, 2024, and entitled "Method, Device, and Product for Allocating Target Task," which is incorporated by reference herein in its entirety.

FIELD

The present disclosure relates to the field of computers and, more particularly, to a method, device, and computer program product for allocating a target task.

BACKGROUND

In today's digital age, businesses and organizations of all sizes are facing increasingly complex and voluminous task processing requirements. Whether to process massive amounts of data or to ensure the stable operation of large-scale applications, distributed processing systems are usually used.

Distributed systems enable parallel processing and collaborative work by allocating tasks to multiple nodes. For example, in a financial transaction system, a large number of transaction requests need to be processed in real time. A distributed system can reasonably allocate transactions to different nodes according to their types and priorities, thereby improving the speed and efficiency of transaction processing while ensuring data accuracy and security.

SUMMARY

Embodiments of the present disclosure provide a method, device, and computer program product for allocating a target task.

In a first aspect of embodiments of the present disclosure, a method is provided. The method includes acquiring a request for allocation of a target resource for a target task. The method further includes determining a first state and a second state of each node in multiple nodes, wherein the first state is indicative of a current state of available resources of each node, and the second state is indicative of a predicted state of available resources of each node after completion of the target task. The method further includes selecting, based on the first state, the second state, and a state transition policy indicative of a priority of a transition between states, a target node from the multiple nodes for use in performing the target task.

In a second aspect of embodiments of the present disclosure, an electronic device is provided. The electronic device includes at least one processor, and a memory coupled to the at least one processor and having instructions stored therein. The instructions, when executed by the at least one processor, cause the electronic device to perform actions. The actions include acquiring a request for allocation of a target resource for a target task. The actions further include determining a first state and a second state of each node in multiple nodes, wherein the first state is indicative of a current state of available resources of each node, and the second state is indicative of a predicted state of available resources of each node after completion of the target task. The actions further include selecting, based on the first state, the second state, and a state transition policy indicative of a priority of a transition between states, a target node from the multiple nodes for use in performing the target task.

In a third aspect of embodiments of the present disclosure, a computer program product is provided. The computer program product is tangibly stored on a non-transitory computer-readable medium and comprises machine-executable instructions. The machine-executable instructions, when executed by a machine, cause the machine to perform actions. The actions include acquiring a request for allocation of a target resource for a target task. The actions further include determining a first state and a second state of each node in multiple nodes, wherein the first state is indicative of a current state of available resources of each node, and the second state is indicative of a predicted state of available resources of each node after completion of the target task. The actions further include selecting, based on the first state, the second state, and a state transition policy indicative of a priority of a transition between states, a target node from the multiple nodes for use in performing the target task.

It should be understood that the content described in this Summary is neither intended to define key or essential features of embodiments of the present disclosure, nor intended to limit the scope of the present disclosure. Other features of the present disclosure will become readily understood from the additional description provided herein.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, identical or similar reference numerals represent identical or similar elements, in which.

DETAILED DESCRIPTION

Figure 1:
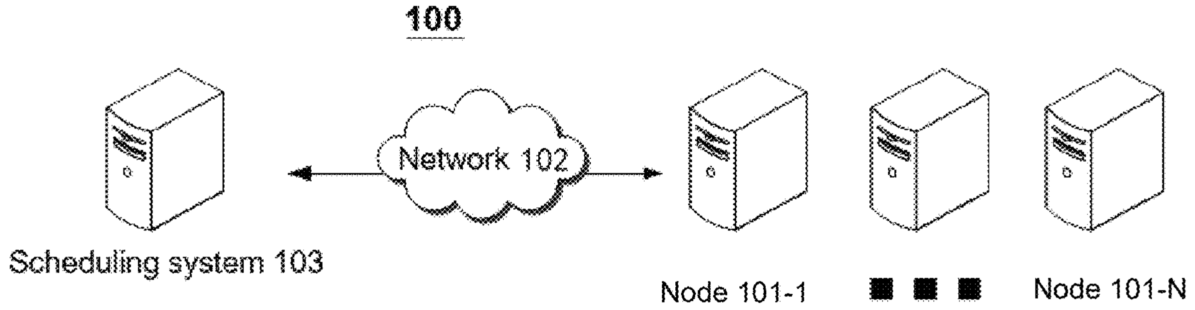
FIG. 1 is a schematic diagram of an example environment in which embodiments of the present disclosure can be implemented.

Illustrative embodiments of the present disclosure will be described below in further detail with reference to the drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

In related technologies, when allocating a target task to a node in a distributed system, the node with more available resources is often simply selected as a target node, thus ensuring that the target task can be completed. However, this may result in a waste of resources. Some nodes may still have some available resources remaining after completing the target task, but they are not enough to undertake most tasks, resulting in these available resources being wasted.

To this end, the present disclosure provides a method for allocating a target task. The method of embodiments of the present disclosure comprises acquiring a request for allocation of a target resource for the target task. The method further includes determining a first state and a second state of each node in multiple nodes, wherein the first state is indicative of a current state of available resources of each node, and the second state is indicative of a predicted state of available resources of each node after completion of the target task. The method further includes selecting, based on the first state, the second state, and a state transition policy indicative of a priority of a transition between states, a target node from the multiple nodes for use in performing the target task. The method according to the present disclosure takes into account not only the current available resources of the node, but also the available resources after the node has completed the target task, and thus is more comprehensive in its consideration, which helps to select a node that is more suitable for performing the target task. By using the state transition policy, the nodes that are more suitable to perform the target task can be assigned higher priority, thus reducing the waste of available resources.

FIG. 1 is a schematic diagram of an example environment 100 in which embodiments of the present disclosure can be implemented. As shown in FIG. 1, the environment 100 may include multiple nodes 101-1 through 101-N, a network 102, and a scheduling system 103. The multiple nodes 101-1 through 101-N are collectively referred to herein as multiple nodes 101. The scheduling system 103 is communicatively coupled to the multiple nodes 101, which may form part of a distributed system. It can be understood that a distributed system is a system comprising multiple nodes which may be computers, servers, or other processing nodes that are connected to each other over a network and work collaboratively. In a distributed system, a user usually faces a single unified service portal, behind which multiple nodes work together to provide this service. These nodes can be located in different physical positions, and they communicate and coordinate through message passing. A distributed system can process and store data and share it among different nodes to achieve higher availability, reliability, and performance. In addition, a distributed system can be used to perform a variety of tasks (including target tasks) including, but not limited to, data processing, storage management, and scientific computing. The network 102 may be, for example, a wide area network (WAN), a local area network (LAN), a wireless network, a public telephone network, an Intranet, and any other type of networks known to those skilled in the art.

In this embodiment, the method for allocating a target task is performed by the scheduling system 103, so as to select a node from the multiple nodes 101 as a target node. Each of the multiple nodes 101 has certain computational resources (e.g., CPU, memory, storage, and so on), which can be allocated for use in different tasks. The scheduling system 103 can monitor the state of available resources of each node and optimize task scheduling based on the current and predicted resource states. The method performed by the scheduling system 103 includes the following steps.

The scheduling system 103 acquires a request for allocation of a target resource for a target task.

The scheduling system 103 determines a first state and a second state of each node in multiple nodes, wherein the first state is indicative of a current state of available resources of each node, and the second state is indicative of a predicted state of available resources of each node after completion of the target task. In this embodiment, when selecting the target node, the scheduling system 103 takes into account not only the current state of available resources of each node, but also the predicted state of available resources of each node after completion of the target task, which helps to select a more suitable node to perform the target task. In some embodiments, the scheduling system uses a machine learning algorithm (e.g., time series analysis, neural networks, or the like) to model and predict data on resource usage of the nodes. With the prediction model, the scheduling system can estimate the number of the remaining available resources after the completion of the current task by each node in some future time period, i.e., the second state.

The scheduling system 103 selects, based on the current state, the predicted state, and a state transition policy indicative of a priority of a transition between states, a target node from the multiple nodes for use in performing the target task. By using the state transition policy, the nodes that are more suitable to perform the target task can be assigned higher priority, thus reducing the waste of available resources in the distributed system. An instance of the scheduling system 103 may be a server for allocating a target task, which is used to provide scheduling services for individual nodes. For example, the scheduling system 103 is a cloud server used to provide basic cloud computing services such as cloud services, cloud databases, cloud computing, cloud functions, cloud storage, network services, cloud communications, middleware services, domain name services, security services, content delivery networks (CDNs), and big data and artificial intelligence platforms.

As shown in FIG. 1, in the environment 100, the network 102 may be used to transmit data between the multiple nodes 101 and the scheduling system 103. The network 102 has a theoretical bandwidth. The theoretical bandwidth refers to a maximum transmission speed supported by the network 102, which indicates a maximum data amount that may be transmitted by the network 102 in an ideal condition, typically measured by the number of transmitted bits per second (bps). For example, if the theoretical bandwidth of the network 102 is 100 Mbps, it means that the network can transmit one hundred megabits of data per second under ideal conditions. In fact, however, due to other possible factors in the network (such as signal interference, bandwidth sharing, and transmission delay), the actual transmission speed may not reach 100 Mbps.

While FIG. 1 illustrates a scenario of a distributed system, it should be noted that the method according to the present disclosure can be applied to a scenario of a non-distributed system. For example, it can be applied to a scenario of a centralized system, as long as the scenario involves the allocation of a target task across multiple nodes (or their equivalents).

Figure 2:
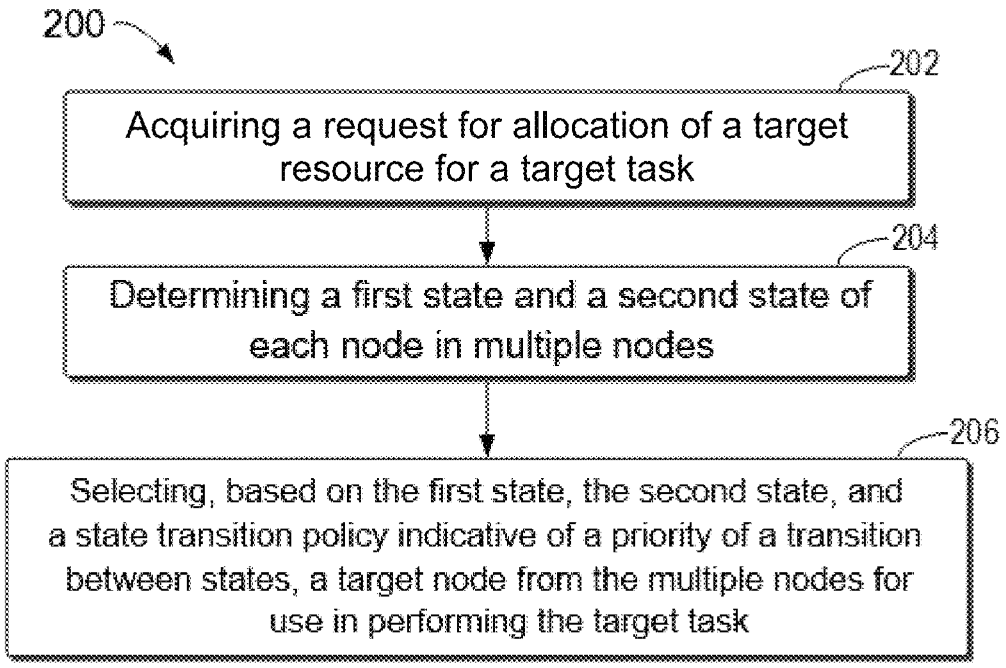
FIG. 2 is a flow chart of a method for allocating a target task according to some embodiments of the present disclosure.

FIG. 2 is a flow chart of a method 200 for allocating a target task according to some embodiments of the present disclosure. As shown in FIG. 2, the method 200 includes block 202 through block 206.

At block 202, a request for allocation of a target resource for the target task is acquired. The target resource may include at least one of a storage disk resource, a central processing unit resource, a bandwidth resource, and a memory resource. In some embodiments, the client identifies a target task to be performed and determines target resources required for this task. The client constructs a request that contains a description of the target task and a list of the required target resources. The client sends the request to the scheduling system.

At block 204, a first state and a second state of each node in multiple nodes are determined, wherein the first state is indicative of a current state of available resources of each node, and the second state is indicative of a predicted state of available resources of each node after completion of the target task. The scheduling system periodically collects data on the available resources of each node, including the number of remaining CPUs, the size of available memory, and the available bandwidth resources. With this data, the scheduling system can determine the first state of each node, i.e., the state of the current available resources.

At block 206, based on the first state, the second state, and a state transition policy indicative of a priority of a transition between states, a target node is selected from the multiple nodes for use in performing the target task. With this state transition policy, priorities can be allocated to different state transitions. Accordingly, the nodes that undergo state transitions also have priorities.

The method according to the present disclosure takes into account not only the current available resources of the node, but also the available resources after the node has completed the target task, and thus is more comprehensive in its consideration, which helps to select a node that is more suitable for performing the target task. Based on the state transition policy of the present disclosure, the nodes that are more suitable to perform the target task can be assigned higher priority, thus reducing the waste of available resources.

Figure 3:
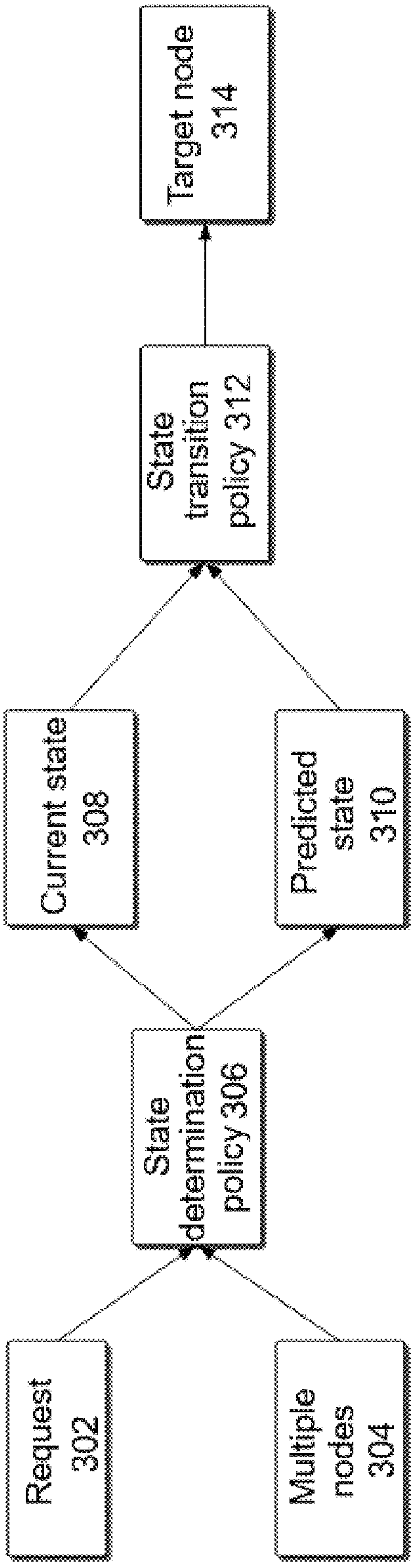
FIG. 3 is a schematic diagram of a process for allocating a target task according to embodiments of the present disclosure.

FIG. 3 is a schematic diagram of a process for allocating a target task according to embodiments of the present disclosure. In this process, there is a request 302 for allocation of a target resource for the target task, and there are multiple nodes 304 in the distributed system for choosing. Upon receipt of the request 302, a current state (i.e., the first state) 308 and a predicted state (i.e., the second state) 310 of each node are determined according to a state determination policy 306.

TABLE 1

| State | Availability | Reasonableness | Sufficiency |
|---|---|---|---|
| A | x | ✓ | / |
| B | ✓ | / | Large |
| C | ✓ | / | Small |
| D | x | x | / |

Table 1 provides a state determination policy according to an example embodiment of the present disclosure. Availability indicates whether the current available resources of a node satisfy the conditions of the available state. Reasonableness indicates whether the current available resources of a node satisfy the conditions of the reasonable state. Sufficiency indicates whether the current available resources of the node are large or small in the case where the conditions of the available state are satisfied, where if the current available resources are large resources, the conditions of the sufficient state are satisfied, and if the current available resources are small resources, the conditions of the adequate state are satisfied. For any node M, it may have several categories of resources. For example, it may currently have 1 TB of available storage disk space, 10 available central processing units, 1000 MB of bandwidth resources, and 100 GB of available memory space. In the embodiment shown in Table 1, a category minimum threshold may be set for each category of resources. For the current state and the predicted state, if each category of resources in the available resources of the node M is greater than the corresponding category minimum threshold, the node M has availability, and therefore the node M is determined to be in the available state (i.e., state B and state C in Table 1). If each category of resources in the available resources of the node M is smaller than the corresponding category minimum threshold, the node M has reasonableness, and therefore the node N is determined to be in the reasonable state (i.e., state A in Table 1). If at least one category of resources in the available resources of the node M is smaller than a corresponding category minimum threshold and at least one category of resources is greater than a corresponding category minimum threshold, the node N is determined to be in the wasted state (i.e., state D in Table 1). As an example, the category minimum threshold may be 10 MB of available storage disk space, 2 available central processing units, 10 MB of bandwidth resources, and 10 GB of available memory space. If the current available resources of a node are 20 MB of available storage disk space, 3 available central processing units, 20 MB of bandwidth resources, and 20 GB of available memory space, the node is in the available state. If the current available resources of a node are 5 MB of available storage disk space, 3 available central processing units, 20 MB of bandwidth resources, and 20 GB of available memory space, the node is in the wasted state. If the current available resources of a node are 5 MB of available storage disk space, 1 available central processing unit, 5 MB of bandwidth resources, and 5 GB of available memory space, the node is in the reasonable state.

In some additional embodiments, if each category of resources in the available resources of the node M is greater than the corresponding category sufficiency threshold, the node M is determined to be in the sufficient state (e.g., state B in Table 1). If at least one category of resources in the available resources of the node M is less than the corresponding category sufficiency threshold, the node M is determined to be in the adequate state (e.g., state C in Table 1). In some alternative embodiments, for each node of which the first state is the available state, each node is classified as the adequate state or the sufficient state according to the available resources of each node by using a size analysis model. In this embodiment, supervised training may be performed on the size analysis model in advance. During the training process, the parameters of each layer in the size analysis model are randomly initialized, and then the available resources of the first node are input into the size analysis model for forward propagation until a first prediction result is output. The value used to indicate the sufficiency of the first node serves as a label for the first node, and the loss for this prediction is determined based on a loss function. For example, a cross-entropy loss function, a mean-square error loss function, a log-likelihood loss function, or the like may be selected. According to this loss, back propagation can be performed using a reverse gradient algorithm, so as to update the parameters of each layer of the size analysis model. By continuously iterating the aforementioned training operations, the size analysis model can be enabled to gradually master the prediction capability in predicting the sufficiency of the available resources of a node according to the size of the available resources of that node.

According to this table, it is possible to classify the state of each node in detail, which helps to select a more suitable target node. It should be noted that the state determination policy of each embodiment applies separately and individually for the first state and the second state. For example, the first state of the node M may be B and the second state may be A, or the first state of the node N may be B and the second state may still be B. Referring back to FIG. 3, after determining the current state 308 and the predicted state 310 of each node, a priority of each node is determined according to a state transition policy 312, and a target node is selected at 314 to perform the target task.

With respect to the state transition policy 312, in some embodiments, if the first state of each node in a first node subset of the multiple nodes is the available state (including the sufficient state and the adequate state) and the second state is the reasonable state, a priority of nodes in the first node subset is determined to be a first priority. In the task allocation process, it may be preferable that the required resources are highly close to the current resources of the node so that the resources of the node can be fully utilized. Since the node does not have many remaining resources, there is no concern about the utilization of the remaining resources.

If the first state of each node in a second node subset of the multiple nodes is the available state and the second state is the available state, a priority of nodes in the second node subset is determined to be a second priority, where the second priority is lower than the first priority. If the first state of each node in a third node subset of the multiple nodes is the available state and the second state is the wasted state, a priority of nodes in the third node subset is determined to be a third priority, where the third priority is lower than the second priority. With this priority determination method of the state transition policy, the resources of the distributed system as a whole can be fully utilized, thus reducing the waste of resources.

On this basis, a node with the highest priority is selected from the first node subset, the second node subset, and the third node subset as the target node at 314 of FIG. 3. In some embodiments, if the first node subset is non-empty, a node is selected from it as the target node. If the first node subset is an empty set, similarities between available resources of each node in the second node subset and the target resource are calculated. Nodes in the second node subset are ranked in order of similarities from low to high, where a node with a lower similarity has a higher priority. Since each node in the second node subset is in the available state before and after the completion of the target task, prioritizing the use of a node with a low similarity to perform the target task can ensure that the node still has many resources left after the node has finished the performance, thereby guaranteeing that more tasks can be undertaken to reduce the waste of resources. The target node is determined according to the ranking. In most cases, the second node subset is not an empty set and has multiple nodes. This embodiment provides a way to further refine the selection of nodes, thereby reducing the waste of resources in the distributed system.

In some embodiments, if the first node subset and the second node subset are both empty sets, similarities between available resources of each node in the third node subset and the target resource are calculated. Nodes in the third node subset are ranked in order of similarities from high to low, where a node with a higher similarity has a higher priority. The target node is determined according to the ranking. Since the second state of each node in the third node subset is the wasted state, which indicates that the remaining resources of the third node after performing the target task are most likely to be wasted, the resource utilization of the distributed system can be improved by prioritizing the use of nodes with high similarities.

In embodiments where the available state is further subdivided into a sufficient state and an adequate state, if the first state of each node in a fourth node subset of the multiple nodes is the sufficient state and the second state is the reasonable state, a priority of nodes in the fourth node subset is determined to be a fourth priority. As above, the priority of the node subset of which the second state is the reasonable state is determined to be one of the highest priorities, which can reduce the waste of resources in the distributed system.

If the first state of each node in a fifth node subset of the multiple nodes is the sufficient state and the second state is the sufficient state, a priority of nodes in the fifth node subset is determined to be a fifth priority, wherein the fifth priority is lower than the fourth priority. If the first state of each node in a sixth node subset of the multiple nodes is the sufficient state and the second state is the adequate state, a priority of nodes in the sixth node subset is determined to be a sixth priority, wherein the sixth priority is lower than the fifth priority. If the first state of each node in a seventh node subset of the multiple nodes is the sufficient state and the second state is the wasted state, a priority of nodes in the seventh node subset is determined to be a seventh priority, wherein the seventh priority is lower than the sixth priority. A node with the highest priority is selected from the fourth node subset, the fifth node subset, the sixth node subset, and the seventh node subset as the target node.

This embodiment provides ways to further refine the priorities of nodes and select a node, which can reduce the waste of resources in the distributed system. Accordingly, in some embodiments, for the fourth node subset to the seventh node subset, similarities between available resources of each node in the target node subset and the target resource are calculated, and the target node is selected from the target node subset according to the similarities.

TABLE 2

| Current state | Predicted state | Priority of node subset | Similarity ranking |
|---|---|---|---|
| C | A | 1 | / |
| B | A | 2 | / |
| B | B | 3 | From low to high |
| C | C | 4 | From low to high |
| B | C | 5 | From low to high |
| C | D | 6 | From high to low |
| B | D | 7 | From high to low |

Table 2 provides a state transition policy according to an embodiment of the present disclosure. In the embodiment shown in Table 2, the priorities of the first node subset to the seventh node subset are clarified, which involve all possible state transitions. In the embodiment shown in Table 2, the priority ranks of A, B, C, and D can be set to 1, 2, 3, and 4, respectively, so that for the state transition of C→A, a change in the priority rank from 3 to 1 can be obtained through calculation, which results in an increase in priority by 2, and thus this state transition is the most prioritized. Similarly, for B→A, the priority rank is increased by 1, which is still positive, and therefore this state transition is also the most prioritized. For B→B and C→C, there is no change in the priority ranks, so they are sequentially ranked behind C→A and B→A according to the size of the current available resources. For B→C and C→D, the priority ranks decrease by 1, and thus they are sequentially ranked behind according to the size of the current available resources. For B→D, the priority rank decreases by 2, so it is ranked last. With this implementation, it is possible to implement the presumption of the state transition policy of Table 2 with only the state determination policy of Table 1 recorded, without having to save the state transition policy of Table 2.

As shown in Table 2, for state transitions of C→A, B→A, B→B, C→C, and B→C, considering that the predicted state of the corresponding node indicates that this node is still bearing the resource requests for most tasks, a higher priority is assigned to a node with a lower similarity in the similarity ranking. This can balance the resource load across nodes and reduce the number of nodes of which available resources are in a critical state, thus improving the overall resource utilization of the distributed system. For state transitions of C→D and B→D, considering that the predicted state of the corresponding node indicates that this node is unlikely to undertake the resource requests for most tasks, a higher priority is assigned to a node with a higher similarity in the similarity ranking. This can minimize the waste of resources, thus improving the overall resource utilization of the distributed system. The use of the state transition policy in Table 2 helps to select an appropriate target node, thus reducing the waste of resources in the distributed system. When calculating the similarity, it can be calculated according to the Euclidean distances between the current available resources of the node and the requested resource.

Figure 4:
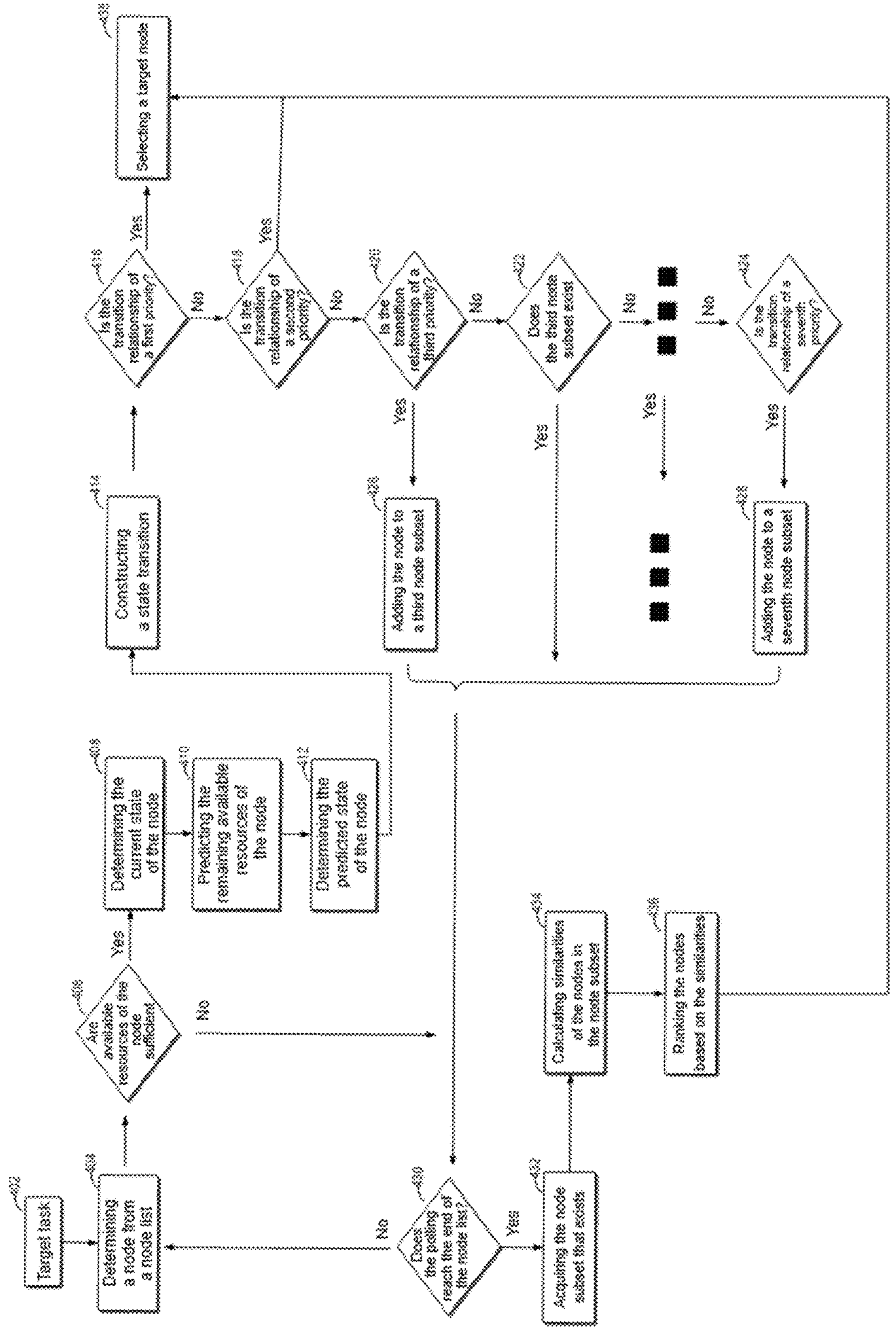
FIG. 4 is a flow chart of a method for allocating a target task according to embodiments of the present disclosure.

FIG. 4 is a flow chart of a method for allocating a target task according to embodiments of the present disclosure. In this embodiment, the resource required for the target task 402 is determined according to a request requesting allocation of a target resource for the target task 402. At 404, starting from any one of nodes in a node list, the node list is polled before the target node is determined. The node list is a list of nodes for the distributed system in which the node is located. For the currently determined node, it is judged at 406 whether the available resources of this node are sufficient for the target task. If it is not adequate, no further judgment is needed, and the node list continues to be polled at 430 to determine the next node. If adequate, the current state of the node is determined at 408. For example, the current state of the node can be determined according to the state determination policy of Table 1.

At 410, the remaining available resources of the node are determined according to the current available resources of the node and the resources required for the target task. For example, the remaining available resources of the node may be determined by subtracting the resources required for the target task from the current available resources of the node. At 412, the predicted state of the node is determined according to the remaining available resources of the node in conjunction with the state determination policy (e.g., of Table 1). After obtaining the current state (i.e., the first state) and the predicted state (i.e., the second state) of the node, a state transition 414 for that node can be constructed. According to Table 2, it can be a state transition of one of C→A, B→A, B→B, C→C, B→C, C→D, or B→D.

Then, starting from the highest priority, it is judged at 416 whether the state transition 414 is of a first priority. If yes, this node is used directly as the target node at 438 to perform the target task. If not, the process proceeds to 418 to judge whether the state transition 414 is of a second priority. If yes, this node is used directly as the target node at 438 to perform the target task. If not, the process proceeds to 420 to judge whether the state transition 414 is of a third priority (i.e., B→B). If yes, this node is added to a third node subset at 426. If not, the process proceeds to 422 to judge whether the third node subset exists.

If the third node subset exists, there is no need to determine which node subset the node belongs to or what its priority is, because the priority of this node is definitely lower than those of the nodes in the third node subset, and so it will definitely not be selected as the target node, in which case the process can proceed to 430 to judge whether the polling has currently reached the end of the node list. This can save a large amount of computational resources. If the polling has not reached the end, the process directly continues to analyze the other nodes without further processing of the node. On the contrary, if it is judged at 422 that the third node subset does not exist, which indicates that the node is still likely to be determined as the target node, a further determination of whether the state transition 414 is of a fourth priority (i.e., C→C) or a fifth priority (i.e., B→C) or a sixth priority (i.e., C→D) is required. The methods of judgment and response are similar to those used for the third priority and will not be repeated.

If the sixth node subset does not exist, which indicates that this state transition 414 is also not of the sixth priority, the process proceeds to 424 to judge whether this state transition 414 is of a seventh priority (i.e., B→D). If yes, this node is added to the seventh node subset at 428. The node list is polled as previously described until it is judged at 430 that the polling has reached the end of the node list, then the process proceeds to 432 to acquire a node subset that exists. According to the previous contents, it is known that the node subset that exists is the node subset with the highest priority. The process proceeds to 434 to calculate the similarities of the nodes in the node subset. The similarity of the node can be calculated, for example, according to the Euclidean distances between the current available resources of the node and the requested resource. At 436, the nodes are ranked according to the similarities of the nodes. If the node subset that exists is any one of the node subsets from the third node subset (i.e., the node subset of B→B) to the fifth node subset (i.e., the node subset of B→C), nodes with low similarities are ranked at the front, and nodes with high similarities are ranked at the back. If the node subset that exists is the sixth node subset (i.e., the node subset of C→D) or the seventh node subset (i.e., the node subset of B→D), nodes with high similarities are ranked at the front, and nodes with low similarities are ranked at the back. For the node subset that exists, the node that is ranked at the head is determined as the target node at 438.

Figure 5A:
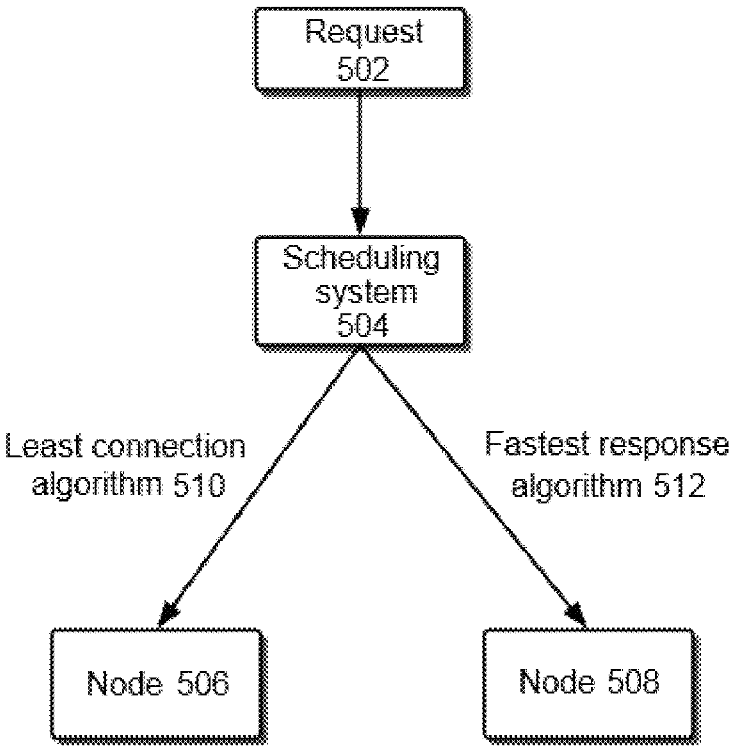
FIGS. 5A-5C are schematic diagrams of processes for allocating a target task according to embodiments of the present disclosure.

In some cases, there may be situations where multiple nodes in the same node subset have the same similarity. In this regard, one of the nodes may be randomly selected as the target node, or the target node may be selected in other ways. FIG. 5A is a schematic diagram of a process for allocating a target task according to embodiments of the present disclosure. In this embodiment, a scheduling system 504 receives a request 502 and then allocates a target node for it. If multiple nodes in the same node subset have the same similarity, different algorithms can be used to analyze these nodes. For example, a node 506 may be selected as the target node by means of a least connection algorithm 510, or a node 508 may be selected as the target node by means of a fastest response algorithm 512. The least connection algorithm 510 indicates the minimum number of connections required for the target task, and the least connection algorithm 510 can analyze the current available resources of the multiple nodes, and can determine the node with the highest bandwidth among them as the target node. The highest bandwidth means the largest amount of data in a single output and the smallest number of transmissions required for a fixed-size workload. The fastest response algorithm 512 indicates the minimum response time required for the target task, and the fastest response algorithm 512 can analyze the numbers of CPUs of the multiple nodes and use the node with the most current available CPUs as the target node to complete the target task as quickly as possible.

Figure 5B:
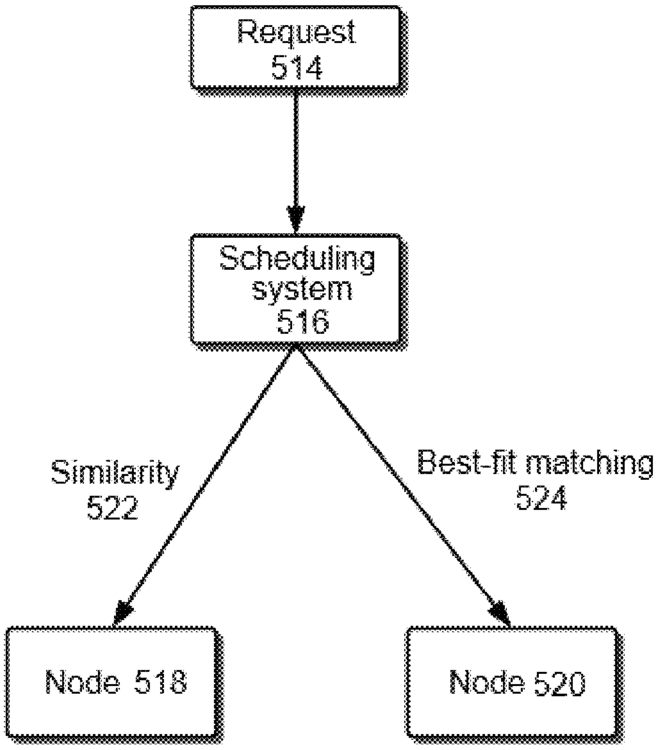

FIG. 5B is a schematic diagram of a process for allocating a target task according to embodiments of the present disclosure. In this alternative embodiment, a scheduling system 516 receives a request 514 and then allocates a target node for it. If multiple nodes exist in the same node subset, a node 518 may be determined as the target node by means of similarity ranking 522. The scheduling system 516 may also select a node 520 as the target node by means of best-fit matching 524. The best-fit matching 524 is a matching policy customized by the scheduling system 516, which may be modified to adapt to different distributed environments.

Figure 5C:
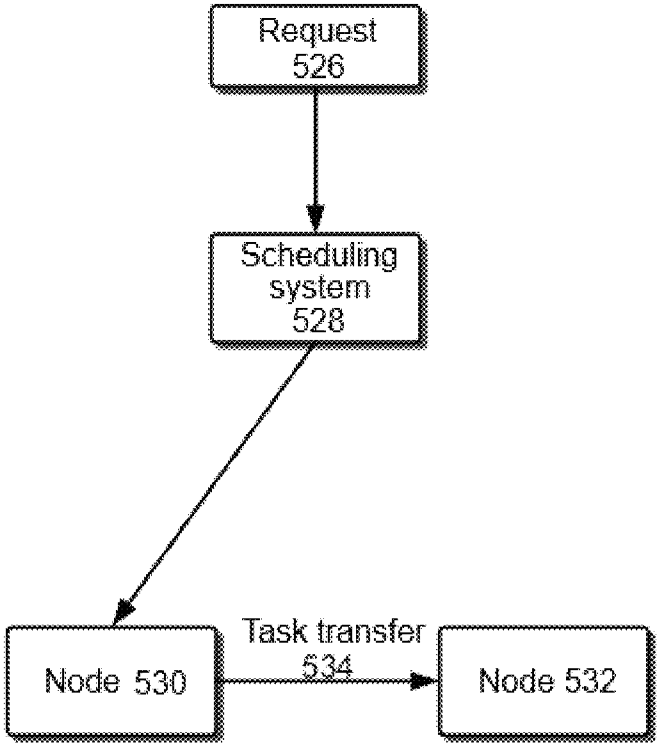

FIG. 5C is a schematic diagram of a process for allocating a target task according to embodiments of the present disclosure. In this alternative embodiment, a scheduling system 528 receives a request 526 and then selects, for example, a node 530 as the target node. However, in some cases, for some reason (e.g., an additional resource overhead occurs), it may be possible that the current available resources of that node 530 are insufficient to complete the target task. In this case, the target task may be transferred by the node 530 to at least one other node 532 in the node subset by means of a task transfer 534 in order to complete the target task. This can avoid re-selecting the target node, thus reducing the complexity and workload of the scheduling system.

Figure 6:
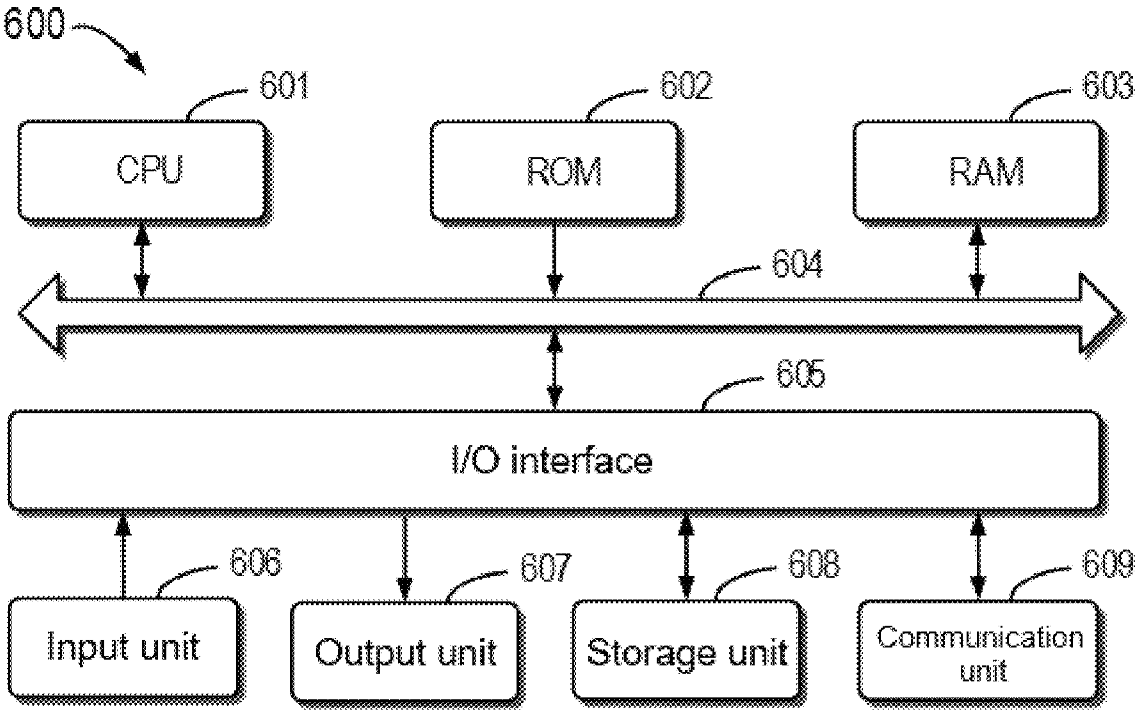
FIG. 6 is a block diagram of an example device that can be used to implement embodiments of the present disclosure.

FIG. 6 is a block diagram of an example device 600 that can be used to implement embodiments of the present disclosure. As shown in the figure, the device 600 includes a computing unit 601, illustratively implemented as at least one central processing unit (CPU), that can perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The computing unit 601, the ROM 602, and the RAM 603 are connected to each other through a bus 604. An input/output (I/O) interface 605 is also connected to the bus 604.

Multiple components in the device 600 are connected to the I/O interface 605, including: an input unit 606, such as a keyboard, a mouse, and the like; an output unit 607, such as various types of displays, speakers, and the like; the storage unit 608, such as a magnetic disk, a compact disc, and the like; and a communication unit 609, such as a network card, a modem, a wireless communication transceiver, and the like. The communication unit 609 allows the device 600 to exchange information/data with other devices via a computer network, such as the Internet, and/or various telecommunication networks.

The computing unit 601 may be various general-purpose and/or special-purpose processing components with processing and computing power. Some examples of the computing unit 601 include, but are not limited to, the above-noted one or more CPUs, a graphics processing unit (GPU), various specialized artificial intelligence (AI) computing chips, various computing units for running machine learning model algorithms, a digital signal processor (DSP), and any appropriate processor, controller, microcontroller, and the like. The computing unit 601 performs various methods and processes described above, such as the method 200. For example, in some embodiments, the method 200 may be implemented as a computer software program that is tangibly included in a machine-readable medium, such as the storage unit 608. In some embodiments, part of or all the computer program can be loaded and/or installed onto the device 600 via the ROM 602 and/or the communication unit 609. When the computer program is loaded to the RAM 603 and executed by the computing unit 601, one or more steps of the method 200 described above may be performed. Alternatively, in other embodiments, the computing unit 601 may be configured to implement the method 200 in any other suitable manners (such as by means of firmware).

The functions described herein may be executed at least in part by one or more hardware logic components. For example, without limitation, example types of hardware logic components that can be used include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program code for implementing the method of the present disclosure can be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should not be construed as an indication that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in multiple implementations separately or in any suitable sub-combination.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means for implementing the functions/acts specified in one or more blocks in the flow charts and/or block diagrams. These computer-readable program instructions may also be stored in a computer-readable storage medium, and these instructions cause a computer, a programmable data processing apparatus, and/or other devices to operate in a particular manner; and thus, the computer-readable medium storing instructions includes an article of manufacture that includes instructions implementing various aspects of the functions/actions specified in one or more blocks in the flow charts and/or block diagrams.

The computer-readable program instructions may also be loaded onto a computer, other programmable data processing apparatuses, or other devices, such that a series of operations or steps are performed on the computer, other programmable data processing apparatuses, or other devices to produce a computer-implemented process, such that the instructions executed on the computer, other programmable data processing apparatuses, or other devices implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions annotated in the blocks may also occur in a sequence different from the sequence annotated in the figures. For example, two successive blocks may actually be executed in parallel substantially, and sometimes they may also be executed in a reverse order, which depends on the functions involved. It should be further noted that each block in the block diagrams and/or flow charts as well as a combination of blocks in the block diagrams and/or flow charts may be implemented using a dedicated hardware-based system that executes specified 5 functions or actions, or using a combination of special hardware and computer instructions.

Various embodiments of the present disclosure have been described above. The above description is illustrative, rather than exhaustive, and is not limited to the disclosed embodiments. Numerous modifications and alterations will be apparent to those of ordinary skill in the art without departing from the scope and spirit of the illustrated embodiments. The selection of terms used herein is intended to best explain the principles and practical applications of the various embodiments and their associated technical improvements, so as to enable persons of ordinary skill in the art to understand the embodiments disclosed herein.

What is claimed is:

1. A method, comprising:

acquiring a request for allocation of a target resource for a target task;

determining a first state and a second state of each node in multiple nodes, wherein the first state is indicative of a current state of available resources of each node, and the second state is indicative of a predicted state of available resources of each node after completion of the target task, wherein each node has at least one category of resources, and each category of resources has a category threshold, and the determining a first state and a second state of each node in the multiple nodes comprises performing the following operations for the first state and the second state of each node:

determining the node to be in an available state in response to each category of resources in the available resources being greater than the corresponding category threshold;

determining the node to be in a reasonable state in response to each category of resources in the available resources being smaller than the corresponding category threshold; and determining the node to be in a wasted state in response to at least one category of resources in the available resources being smaller than a corresponding category threshold and at least one category of resources being greater than a corresponding category threshold;

determining types of state transitions based on the first state and the second state of each node in accordance with a state transition policy;

assigning priorities to the nodes based on the determined types of state transitions, the priorities including at least first, second and third priorities, with the second priority being lower than the first priority and the third priority being lower than the second priority;

selecting, based on the assigned priorities, a target node from the multiple nodes for use in performing the target task, as a node having a highest one of the priorities among the priorities assigned to the nodes, wherein responsive to the highest one of the priorities among the priorities assigned to the nodes being lower than at least the first and second priorities, initiating a similarity analysis for at least a subset of the nodes in conjunction with the selecting; and executing the target task on the target node.

2. The method according to claim 1, wherein the category threshold for each category of resources comprises a corresponding category minimum threshold.

3. The method according to claim 2, wherein selecting a target node from the multiple nodes for use in performing the target task comprises:

determining, in response to the first state of each node in a first node subset of the multiple nodes being the available state and the second state being the reasonable state, a priority of nodes in the first node subset to be the first priority;

determining, in response to the first state of each node in a second node subset of the multiple nodes being the available state and the second state being the available state, a priority of nodes in the second node subset to be the second priority;

determining, in response to the first state of each node in a third node subset of the multiple nodes being the available state and the second state being the wasted state, a priority of nodes in the third node subset to be the third priority; and selecting a node with the highest priority from the first node subset, the second node subset, and the third node subset as the target node.

4. The method according to claim 3, wherein selecting a node with the highest priority from the first node subset, the second node subset, and the third node subset as the target node comprises:

calculating, in response to the first node subset being an empty set, similarities between available resources of each node in the second node subset and the target resource;

ranking nodes in the second node subset in order of similarities from low to high; and determining the target node according to the ranking.

5. The method according to claim 3, wherein selecting a node with the highest priority from the first node subset, the second node subset, and the third node subset as the target node comprises:

calculating, in response to the first node subset and the second node subset both being empty sets, similarities between available resources of each node in the third node subset and the target resource;

ranking nodes in the third node subset in order of similarities from high to low; and determining the target node according to the ranking.

6. The method according to claim 1, further comprising:

determining the node to be in a sufficient state in response to each category of resources in the available resources being greater than a corresponding category sufficiency threshold; and determining the node to be in an adequate state in response to at least one category of resources in the available resources being smaller than a corresponding category sufficiency threshold.

7. The method according to claim 6, wherein selecting a target node from the multiple nodes for use in performing the target task comprises:

determining, in response to the first state of each node in a fourth node subset of the multiple nodes being the sufficient state and the second state being the reasonable state, a priority of nodes in the fourth node subset to be a fourth priority;

determining, in response to the first state of each node in a fifth node subset of the multiple nodes being the sufficient state and the second state being the sufficient state, a priority of nodes in the fifth node subset to be a fifth priority, wherein the fifth priority is lower than the fourth priority;

determining, in response to the first state of each node in a sixth node subset of the multiple nodes being the sufficient state and the second state being the adequate state, a priority of nodes in the sixth node subset to be a sixth priority, wherein the sixth priority is lower than the fifth priority;

determining, in response to the first state of each node in a seventh node subset of the multiple nodes being the sufficient state and the second state being the wasted state, a priority of nodes in the seventh node subset to be a seventh priority, wherein the seventh priority is lower than the sixth priority; and selecting a node with the highest priority from the fourth node subset, the fifth node subset, the sixth node subset, and the seventh node subset as the target node.

8. The method according to claim 7, wherein selecting a node with the highest priority from the fourth node subset, the fifth node subset, the sixth node subset, and the seventh node subset as the target node comprises:

selecting a target node subset from the fourth node subset to the seventh node subset according to the priority;

calculating similarities between available resources of each node in the target node subset and the target resource; and selecting the target node from the target node subset according to the similarities.

9. The method according to claim 8, wherein calculating similarities between available resources of each node in the target node subset and the target resource comprises:

calculating Euclidean distances between the available resources of each node in the target node subset and the target resource; and determining the similarities between the available resources of each node in the target node subset and the target resource according to the Euclidean distances.

10. The method according to claim 1, further comprising:

classifying, for each node of which the first state is the available state, the node as being in an adequate state or a sufficient state according to the available resources of the node by using a size analysis model.

11. An electronic device, comprising:

at least one processor; and memory coupled to the at least one processor and having instructions stored therein, wherein the instructions, when executed by the at least one processor, cause the electronic device to perform actions comprising:

acquiring a request for allocation of a target resource for a target task;

determining a first state and a second state of each node in multiple nodes, wherein the first state is indicative of a current state of available resources of each node, and the second state is indicative of a predicted state of available resources of each node after completion of the target task, wherein each node has at least one category of resources, and each category of resources has a category threshold, and the determining a first state and a second state of each node in the multiple nodes comprises performing the following operations for the first state and the second state of each node:

determining the node to be in an available state in response to each category of resources in the available resources being greater than the corresponding category threshold;

determining the node to be in a reasonable state in response to each category of resources in the available resources being smaller than the corresponding category threshold; and determining the node to be in a wasted state in response to at least one category of resources in the available resources being smaller than a corresponding category threshold and at least one category of resources being greater than a corresponding category threshold;

determining types of state transitions based on the first state and the second state of each node in accordance with a state transition policy;

assigning priorities to the nodes based on the determined types of state transitions, the priorities including at least first, second and third priorities, with the second priority being lower than the first priority and the third priority being lower than the second priority;

selecting, based on the assigned priorities, a target node from the multiple nodes for use in performing the target task, as a node having a highest one of the priorities among the priorities assigned to the nodes, wherein responsive to the highest one of the priorities among the priorities assigned to the nodes being lower than at least the first and second priorities, initiating a similarity analysis for at least a subset of the nodes in conjunction with the selecting; and executing the target task on the target node.

12. The electronic device according to claim 11, wherein the category threshold for each category of resources comprises a corresponding category minimum threshold.

13. The electronic device according to claim 12, wherein selecting a target node from the multiple nodes for use in performing the target task comprises:

determining, in response to the first state of each node in a first node subset of the multiple nodes being the available state and the second state being the reasonable state, a priority of nodes in the first node subset to be the first priority;

determining, in response to the first state of each node in a second node subset of the multiple nodes being the available state and the second state being the available state, a priority of nodes in the second node subset to be the second priority;

determining, in response to the first state of each node in a third node subset of the multiple nodes being the available state and the second state being the wasted state, a priority of nodes in the third node subset to be the third priority; and selecting a node with the highest priority from the first node subset, the second node subset, and the third node subset as the target node.

14. The electronic device according to claim 13, wherein selecting a node with the highest priority from the first node subset, the second node subset, and the third node subset as the target node comprises:

calculating, in response to the first node subset being an empty set, similarities between available resources of each node in the second node subset and the target resource;

ranking nodes in the second node subset in order of similarities from low to high; and determining the target node according to the ranking.

15. The electronic device according to claim 13, wherein selecting a node with the highest priority from the first node subset, the second node subset, and the third node subset as the target node comprises:

calculating, in response to the first node subset and the second node subset both being empty sets, similarities between available resources of each node in the third node subset and the target resource;

ranking nodes in the third node subset in order of similarities from high to low; and determining the target node according to the ranking.

16. The electronic device according to claim 11, wherein the actions further comprise:

determining the node to be in a sufficient state in response to each category of resources in the available resources being greater than a corresponding category sufficiency threshold; and determining the node to be in an adequate state in response to at least one category of resources in the available resources being smaller than a corresponding category sufficiency threshold.

17. The electronic device according to claim 16, wherein selecting a target node from the multiple nodes for use in performing the target task comprises:

determining, in response to the first state of each node in a fourth node subset of the multiple nodes being the sufficient state and the second state being the reasonable state, a priority of nodes in the fourth node subset to be a fourth priority;

determining, in response to the first state of each node in a fifth node subset of the multiple nodes being the sufficient state and the second state being the sufficient state, a priority of nodes in the fifth node subset to be a fifth priority, wherein the fifth priority is lower than the fourth priority;

determining, in response to the first state of each node in a sixth node subset of the multiple nodes being the sufficient state and the second state being the adequate state, a priority of nodes in the sixth node subset to be a sixth priority, wherein the sixth priority is lower than the fifth priority;

determining, in response to the first state of each node in a seventh node subset of the multiple nodes being the sufficient state and the second state being the wasted state, a priority of nodes in the seventh node subset to be a seventh priority, wherein the seventh priority is lower than the sixth priority; and selecting a node with the highest priority from the fourth node subset, the fifth node subset, the sixth node subset, and the seventh node subset as the target node.

18. The electronic device according to claim 17, wherein selecting a node with the highest priority from the fourth node subset, the fifth node subset, the sixth node subset, and the seventh node subset as the target node comprises:

selecting a target node subset from the fourth node subset to the seventh node subset according to the priority;

calculating similarities between available resources of each node in the target node subset and the target resource; and selecting the target node from the target node subset according to the similarities.

19. The electronic device according to claim 18, wherein calculating similarities between available resources of each node in the target node subset and the target resource comprises:

calculating Euclidean distances between the available resources of each node in the target node subset and the target resource; and determining the similarities between the available resources of each node in the target node subset and the target resource according to the Euclidean distances.

20. A computer program product comprising a non-transitory computer-readable medium and comprising having machine-executable instructions stored therein, wherein the machine-executable instructions, when executed by a machine, cause the machine to perform actions comprising:

acquiring a request for allocation of a target resource for a target task;

determining a first state and a second state of each node in multiple nodes, wherein the first state is indicative of a current state of available resources of each node, and the second state is indicative of a predicted state of available resources of each node after completion of the target task, wherein each node has at least one category of resources, and each category of resources has a category threshold, and the determining a first state and a second state of each node in the multiple nodes comprises performing the following operations for the first state and the second state of each node:

determining the node to be in an available state in response to each category of resources in the available resources being greater than the corresponding category threshold;

determining the node to be in a reasonable state in response to each category of resources in the available resources being smaller than the corresponding category threshold; and determining the node to be in a wasted state in response to at least one category of resources in the available resources being smaller than a corresponding category threshold and at least one category of resources being greater than a corresponding category threshold;

determining types of state transitions based on the first state and the second state of each node in accordance with a state transition policy;

assigning priorities to the nodes based on the determined types of state transitions, the priorities including at least first, second and third priorities, with the second priority being lower than the first priority and the third priority being lower than the second priority;

selecting, based on the assigned priorities, a target node from the multiple nodes for use in performing the target task, as a node having a highest one of the priorities among the priorities assigned to the nodes, wherein responsive to the highest one of the priorities among the priorities assigned to the nodes being lower than at least the first and second priorities, initiating a similarity analysis for at least a subset of the nodes in conjunction with the selecting; and executing the target task on the target node.

* * * * *